US011035985B1

(12) United States Patent
Chriqui et al.

(10) Patent No.: US 11,035,985 B1
(45) Date of Patent: *Jun. 15, 2021

(54) MULTI-LENSLET PIC IMAGERS AND PACKAGING CONFIGURATIONS

(71) Applicant: LOCKHEED MARTIN CORPORATION, Bethesda, MD (US)

(72) Inventors: Guy Chriqui, San Mateo, CA (US); Chad E. Ogden, San Marcos, CA (US); Richard L. Kendrick, San Mateo, CA (US); Katherine Emily Badham, Mountain View, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/287,980

(22) Filed: Feb. 27, 2019

(51) Int. Cl.
*G02B 3/00* (2006.01)
*G02B 27/00* (2006.01)
*H04N 5/232* (2006.01)
*G01B 9/02* (2006.01)
*G02B 6/34* (2006.01)

(52) U.S. Cl.
CPC ....... *G02B 3/0062* (2013.01); *G01B 9/02051* (2013.01); *G02B 6/34* (2013.01); *G02B 27/0087* (2013.01); *H04N 5/23296* (2013.01)

(58) Field of Classification Search
CPC .... G02B 3/0062; G02B 6/34; G02B 27/0087; G01B 9/02051; H04N 5/23296
USPC ........................................................ 359/621
See application file for complete search history.

(56) References Cited

U.S. PATENT DOCUMENTS

| 5,771,321 | A  | * | 6/1998  | Stern    | G02B 26/02   |
|           |    |   |         |          | 385/31       |
| 6,594,420 | B1 | * | 7/2003  | Lange    | H01S 3/06754 |
|           |    |   |         |          | 385/129      |
| 8,611,756 | B1 | * | 12/2013 | Wach     | G02B 6/43    |
|           |    |   |         |          | 398/140      |
| 10,698,201| B1 | * | 6/2020  | Lamkin   | H01L 27/14627|
| 2008/0128618 | A1 | * | 6/2008 | Rahman   | G02F 1/353   |
|           |    |   |         |          | 250/332      |
| 2008/0130084 | A1 | * | 6/2008 | Goddard  | G02F 3/00    |
|           |    |   |         |          | 359/240      |
| 2009/0154872 | A1 | * | 6/2009 | Sherrer  | G02B 6/4248  |
|           |    |   |         |          | 385/14       |
| 2012/0319005 | A1 | * | 12/2012| Robertson| G01N 21/648  |
|           |    |   |         |          | 250/458.1    |
| 2014/0376001 | A1 | * | 12/2014| Swanson  | G01B 9/02004 |
|           |    |   |         |          | 356/479      |
| 2017/0276870 | A1 | * | 9/2017 | Snyman   | G02B 6/136   |
| 2018/0122143 | A1 | * | 5/2018 | Ellwood, Jr. | H04N 9/31|
| 2018/0173000 | A1 | * | 6/2018 | Rothberg | G02B 27/0911 |

* cited by examiner

*Primary Examiner* — James R Greece
(74) *Attorney, Agent, or Firm* — Morgan, Lewis & Bockius LLP

(57) ABSTRACT

A dual-lenslet array photonic integrated circuit (PIC) imager includes a PIC and top and bottom substrate spacers. A first optical prism couples a first lenslet array to a first-side edge of the PIC. A second optical prism couples a second lenslet array to a second-side edge of the PIC. Lenslets of the first lenslet array and respective lenslets of the second lenslet array are coupled to respective waveguides embedded in the in the PIC.

20 Claims, 6 Drawing Sheets

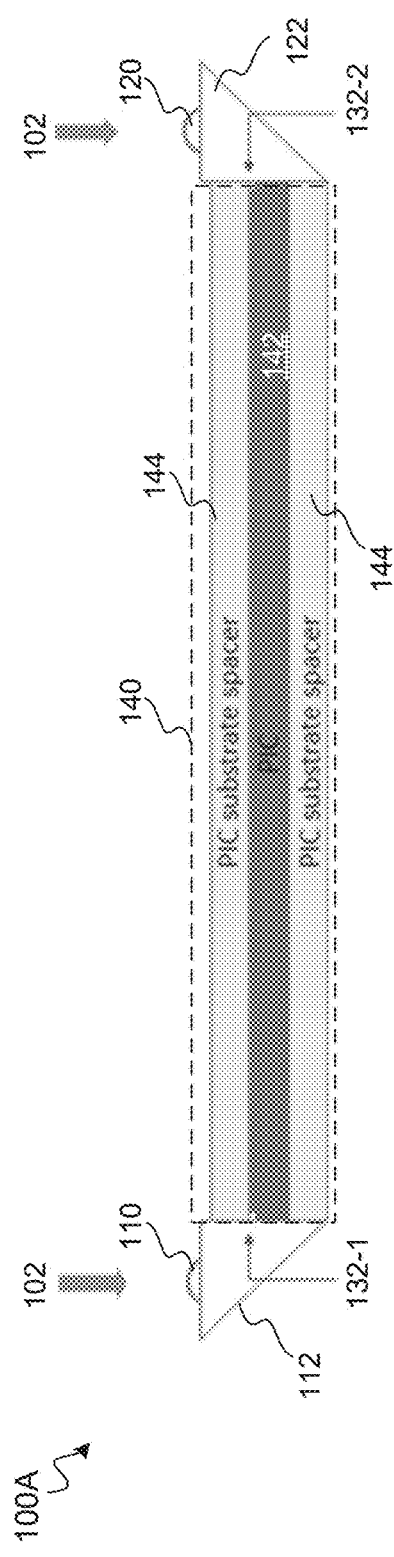
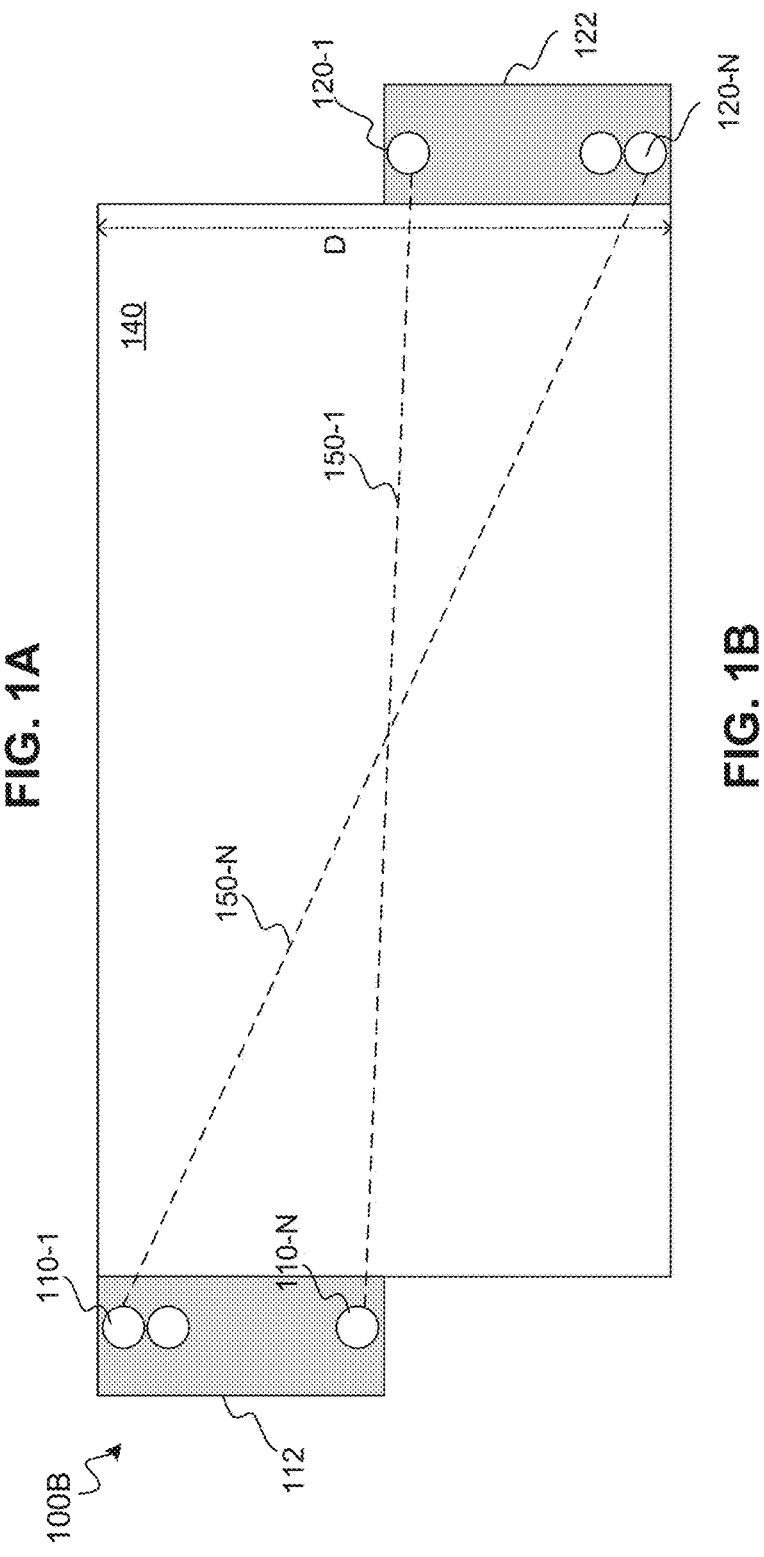
FIG. 1A
FIG. 1B

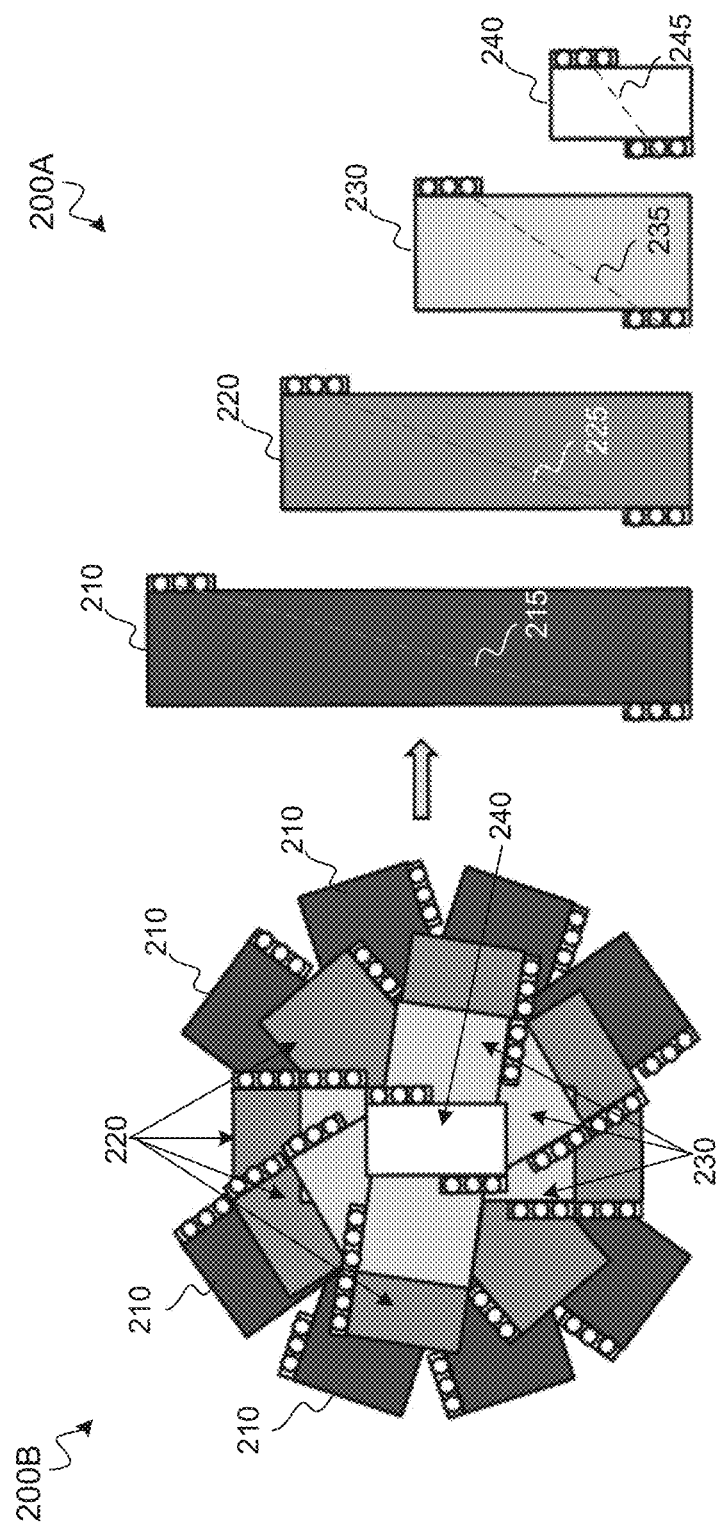

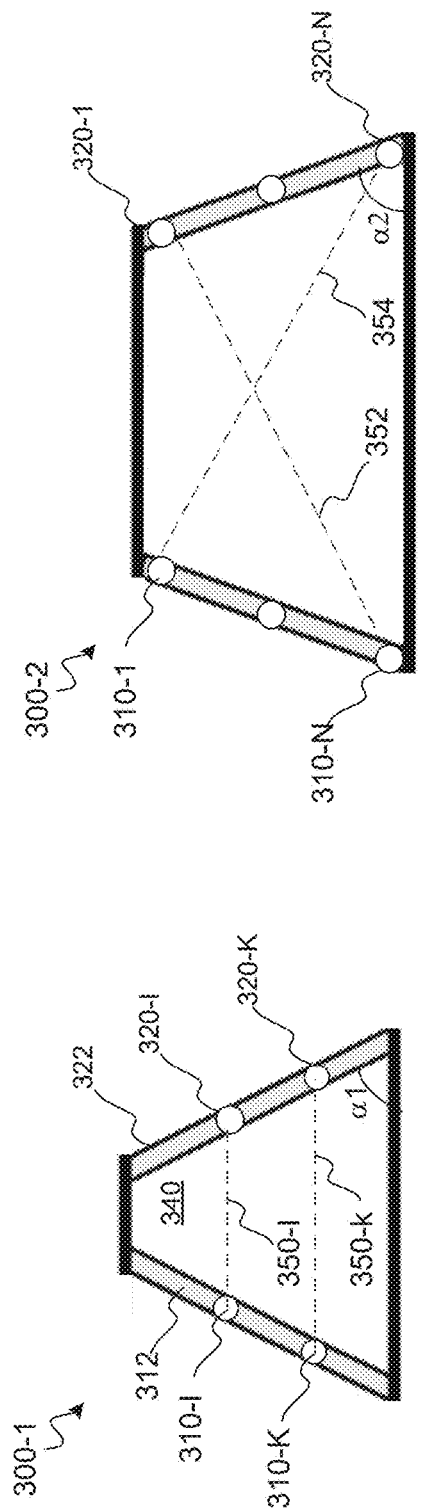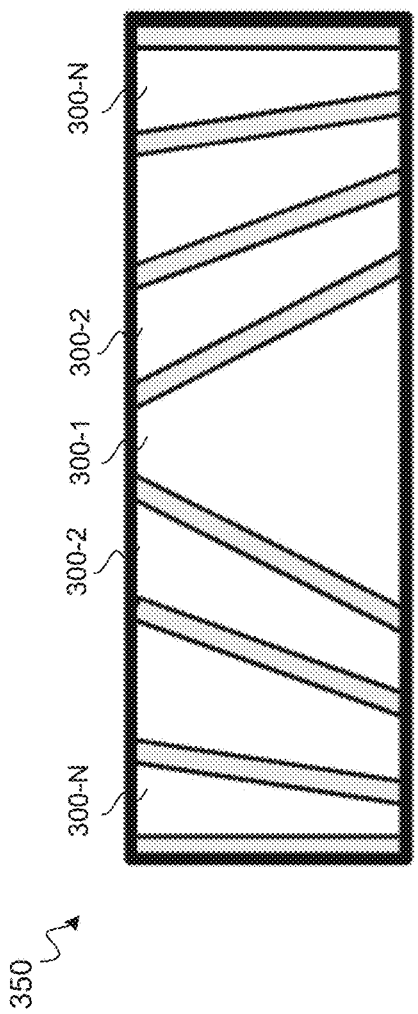

MULTI-LENSLET PIC IMAGERS AND PACKAGING CONFIGURATIONS

STATEMENT REGARDING FEDERALLY SPONSORED RESEARCH OR DEVELOPMENT

Not applicable.

FIELD OF THE INVENTION

The present invention generally relates to photonic integrated circuits, and more particularly to multi-lenslet photonic integrated circuit (PIC) imagers and packaging configurations.

BACKGROUND

Segmented planar imaging detector for electro-optical reconnaissance (SPIDER) is an imaging system formed with waveguide arrays and other components needed to combine light from separate optical collectors, such as telescopes or lenslets. SPIDER can achieve the performance capability needed by a number of space missions in a radically compressed and low-mass and/or -power package. SPIDER has been used in a number of imaging systems including heterodyne imaging systems, which leverage the SPIDER concept to develop photonics-enabled heterodyne electro-optical phased array (HEOPA). Alternative SPIDER configurations with more efficiency and less size, weight and cost are required.

SUMMARY

According to various aspects of the subject technology, methods and configuration are disclosed for providing multi-lenslet photonic integrated circuit (PIC) imagers and packaging configurations.

In one or more aspects, a dual-lenslet array photonic integrated circuit (PIC) imager contains a PIC including top and bottom substrate spacers. A first optical prism couples a first lenslet array to a first-side edge of the PIC. A second optical prism couples a second lenslet array to a second-side edge of the PIC. Lenslets of the first lenslet array and respective lenslets of the second lenslet array are coupled to respective waveguides embedded in the PIC.

In other aspects, an interferometric imager includes a stack of a set of multi-lenslet PIC imagers for sampling spatial frequencies of a target. Each multi-lenslet PIC imager contains a PIC including top and bottom substrate spacers. Multiple optical prisms are used to couple a number of lenslet arrays to edges of the PIC. A number of waveguides are embedded in the PIC and are used to couple respective lenslets of the lenslet arrays.

In yet other aspects, a method of providing an interferometric imager includes stacking a set of multi-lenslet PIC imagers to sample spatial frequencies of a target. A number of optical prisms are coupled to edges of each PIC imager. Each optical prism is coupled to a lenslet array. A number of waveguides are embedded in each PIC imager and are used to couple pairs of lenslets of the lenslet arrays coupled to optical prisms attached to opposing edges of each PIC imager. The set of multi-lenslet PIC imagers are separated from one another by substrate spacers.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 1A and 1B are schematic diagrams illustrating a side view and a top view of an example of a dual-lenslet array photonic integrated circuit (PIC) imager, according to certain aspects of the disclosure.

FIGS. 2A and 2B are schematic diagrams illustrating top views of examples of dual-lenslet array PIC imagers and a corresponding nested fan configuration, according to certain aspects of the disclosure.

FIGS. 3A, 3B and 3C are schematic diagrams illustrating top views of examples of dual-lenslet array PIC imagers and a corresponding nested linear configuration, according to certain aspects of the disclosure.

DETAILED DESCRIPTION

Figure 4A:
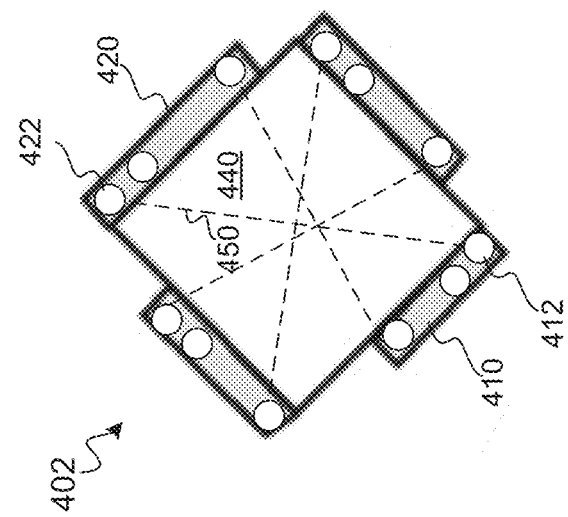
FIGS. 4A and 4B are schematic diagrams illustrating top views of examples of multi-sided lenslet array PIC imagers and a corresponding stacked configuration, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the subject technology, methods and configurations are described for providing multi-lenslet array photonic integrated circuit (PIC) imagers. The PIC imagers of the subject technology are interferometer imagers and may include dual-lenslet arrays coupled to a PIC via two prisms. It is known that the resolution of an interferometric imager is limited by the maximum separation, or baseline, between two lenslets. A single-lenslet array coupled into a PIC has a maximum baseline limited by the maximum size of the lenslet array. The PIC imagers of the subject technology achieve a maximum baseline that is not limited by the size of the lenslet array and can be stacked into various configurations to leverage a larger distribution of baselines available.

FIGS. 1A and 1B are schematic diagrams illustrating a side view 100A and a top view 100B of an example of a dual-lenslet array PIC imager, according to certain aspects of the disclosure. The side view 100A shows a number of features of the dual-lenslet array PIC imager including a PIC module 140, two prisms 112 and 122, lenslets 110 and 120 and waveguides 132 (132-1 and 132-2). The PIC module 140 includes a PIC 142 sandwiched between two PIC substrate spacers 144 attached to top and bottom surfaces of the PIC 142. The PIC substrate spacers 144 provide additional thickness for the PIC module 140 that allows secure attachment of the prisms 112 and 122 to the PIC module 140.

In some implementations, the lenslets 110 and 120 are respectively incorporated into the prisms 112 and 122 with the lenslets 110 and 120 facing normal to the plane of the PIC 142. The prisms 112 and 122 function as 90-degree folds to couple light beams 102 from the lenslets into the waveguides 132 of the PIC 142 at the edges of the PIC 142. The waveguides run through the PIC 142 and are coupled to optical combiner and phase shifters, which direct the combined beams to suitable optical modulators and detectors for processing. In one or more implementations, the ends of the PIC module 140 can be cut at an angle so that the prisms 112 and 122 are not parallel, making a larger distribution of baselines available. For the PIC module 140, the maximum baseline separation between two lenslets is limited by the maximum size of the PIC, not the size of the lenslet arrays.

The top view 100B shows the PIC module 140, prisms 112 and 122 and lenslets 110 and 120. The lenslets 110 and 120 are implemented as lenslet arrays including lenslets 110-1 through 110-N and 120-1 through 120-N. The PIC module 140 can generally be manufactured larger than a lenslet array formed on a prism 112 or 122. This extends the manufacturable size of a PIC interferometric imager, and increases the attainable imaging resolution. The disclosed solution, as represented by the top view 100B, is constrained by the manufacturable size of the PIC module 140, rather than the size of the lenslet arrays. The lengths of the lenslet arrays 110 and 120 are approximately equal to half of a length D of the side edge of the PIC module 140, and lenslet arrays are attached diagonally to the first-side edge and the second-side edge of the PIC module 140 to achieve the largest possible baselines. Also shown in FIG. 1B are the shortest baseline 150-1 and the longest baseline 150-N. The shortest baseline 150-1 is between lenslets 110-N and 120-1, and the longest baseline 150-N is between lenslets 110-1 and 120-N and is clearly longer than the dimensions of the side edges of the PIC module 140. In other words, the subject technology allows for interferometer baselines up to the full manufacturable PIC diameter.

FIGS. 2A and 2B are schematic diagrams illustrating top views 200A and 200B of examples of dual-lenslet array PIC imagers and a corresponding nested fan configuration, according to certain aspects of the disclosure. The top view 200A shows dual-lenslet array PIC imagers (hereinafter, PIC imagers) 210, 220, 230 and 240, which are similar in structure to the PIC imager discussed with respect to FIGS. 1A and 1B and are implemented in different length sizes. The difference in length of the PIC imagers 210, 220, 230 and 240 allows for a wider baseline length diversification, which translates into more special frequencies on the special frequency space (e.g., U, V). For example, similar baselines (e.g., between similar lenslets) 215, 225, 235 and 245 of the PIC imagers 210, 220, 230 and 240 are different in length, thus contributing to the wider baseline length diversification.

The top view 200B shows a nested fan configuration formed by stacking one or more of each of the PIC imagers 210, 220, 230 and 240. In some implementations, more than two instances of any of PIC imagers 210, 220, 230 and 240 may be used in the stack to form the nested fan configuration. For example, four instances of the PIC imager 210, four instances of the PIC imager 220, three instances of the PIC imager 230 and one instance of the PIC imager 240 are combined to form the stack shown in the top view 200B. Different instances of each PIC imager (e.g., 210) are placed at different angular positions to cover a wider angular distribution of the spatial frequencies. It is understood that the stack is not restricted to the limited instances of the PIC imagers 210, 220, 230 and 240, and can include any practical number of instances of different PIC imagers. The more PIC imagers of different sizes and the more angular coverage achieved by placing PIC imagers at more angular positions, the richer the sampling of spatial frequencies of a desired target. However, one limitation in combining the PIC imagers is that any obscuring of the lenslets has to be avoided, and the lenslet arrays of different PIC imagers have to be fully exposed to the incoming light beams (e.g., 102 of FIG. 1A) from the desired target.

FIGS. 3A, 3B and 3C are schematic diagrams illustrating top views of examples of dual-lenslet array PIC imagers 300-1 and 300-2 and a corresponding nested linear configuration 350, according to certain aspects of the disclosure. The dual-lenslet array PIC imager 300-1 (hereinafter, PIC imager 300-1) is a trapezoidal PIC imager and includes a PIC 340, prisms 312 and 322, and lenslets 310 and 320. The prisms 312 and 322 are similar to the prisms 112 and 122 of FIG. 1A and are attached to the side edges of the PIC 340, which include waveguides for coupling pairs of lenslets 310 and 320 (e.g., 310-I to 320-I) to respective phase shifters and combiners. In one or more implementations, the number of lenslets incorporated on prisms 312 and 322 are equal. The length of the side edges of the trapezoidal PIC 340 can, however, be equal or unequal. For example, the longer edge can be attached to a longer prism with the same number of lenslets having larger spaces between the lenslets. The diversification of baseline length is provided by different sizes of the baselines, for example, baselines 350-I and 350-K.

The dual-lenslet array PIC imager 300-2 (hereinafter, PIC imager 300-2) is a larger trapezoidal PIC imager similar to the PIC imager 300-1 of FIG. 3A. The PIC imager 300-2 may have prisms with the same length or different length from the prisms 312 and 322 of FIG. 3A, but has a larger width than the PIC imager 300-1. In some implementations, the lenslet arrays of the PIC imager 300-2 may have a different angle (e.g., α2) than the angle (e.g., α1) of the lenslet arrays of the PIC imager 300-1. In one or more implementations, the PIC imager 300-2 may employ a baseline configuration similar to the baseline configuration of the PIC imager 300-1. In some implementations, the PIC imager 300-2 can use a different baseline configuration, for example, having a baseline 352 between lenslets 310-N and 320-1 and another baseline 354 between lenslets 310-1 and 320-N. The baselines 352 and 354 may have the same length or different lengths, dependent on the shape of the PIC imager 300-2, but they are at different angles.

The nested linear configuration 350 is a linear stack of a number of (e.g., N) trapezoidal PIC imagers similar to the PIC imagers 300-1 and 300-2. For example, PIC imagers 300-1, 300-2 . . . 300-N are trapezoidal PIC imagers with different widths, and each of them may have equal or nonequal side lengths. In one or more implementations, the lenslet array angles of the stacked PIC imagers 300-1, 300-2 . . . 300-N can be different. The nested linear configuration 350 provides a wide distribution of baseline lengths and angles and can fill a dense linear and angular diversification of spatial frequencies (U and V), while being compact and easy to manufacture. The use of double-ended PIC imagers enables utilizing baselines up to the length of the entire device, while stacking PIC imagers enables a dense spatial frequency sampling in a package that grows only in thickness as more PIC imagers are added.

Figure 4B:
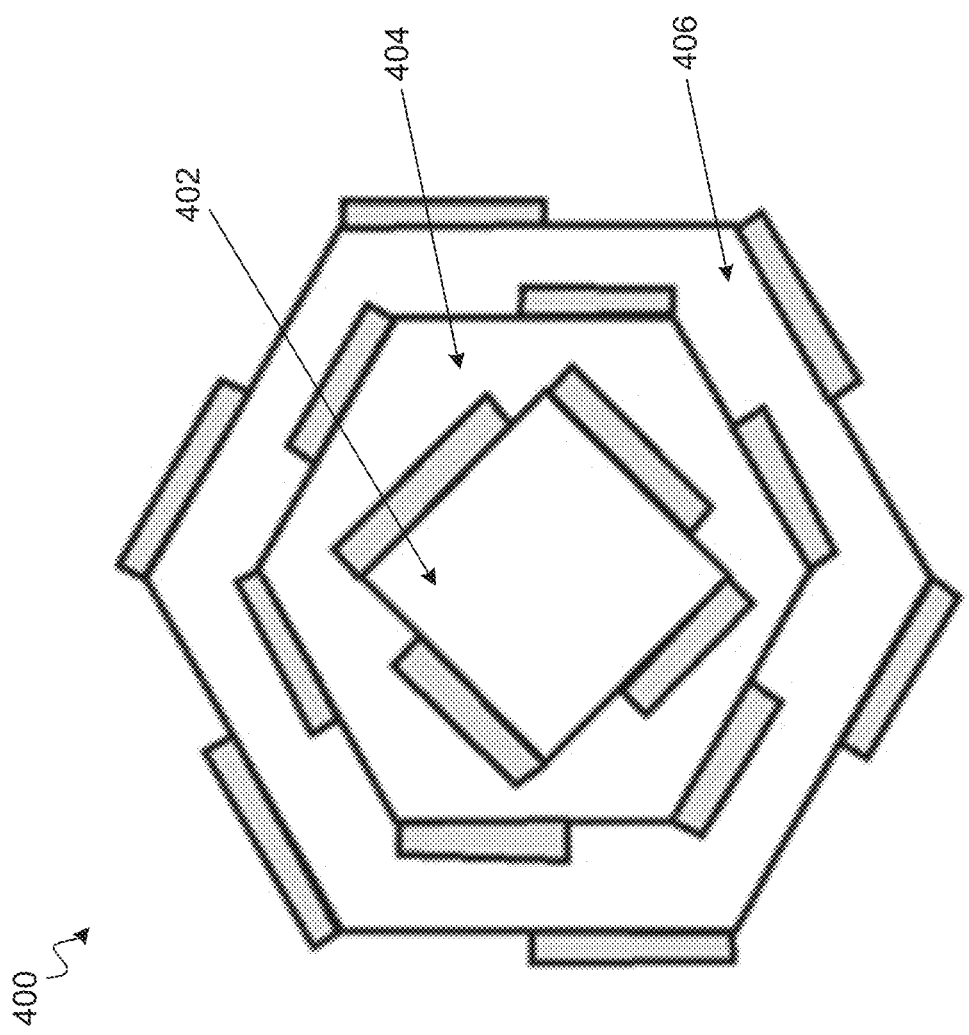

FIGS. 4A and 4B are schematic diagrams illustrating top views of examples of a multi-sided lenslet array PIC imager 402 and a corresponding stacked configuration 400, according to certain aspects of the disclosure. The multi-sided lenslet array PIC imager 402 (hereinafter, PIC imager 402) is a four-sided PIC imager with four prisms (e.g., 410 and 420) on four sides of a PIC 440. The attachments of the prisms are similar to the attachment of the prisms 112 and 122 to the PIC module 140 of FIG. 1A. On each prism, a number of lenslets (e.g., 412 and 422) are incorporated. The four-sided PIC imager 402 provides for baselines (e.g., 450) that are not only diversified in length, but also have an angular diversification as well. This allows better filling of the spatial frequencies of the UV space.

The stacked configuration 400 is a nested configuration including a number of multi-sided PIC imagers stacked on top of each other. For example, the stacked configuration 400 includes PIC imagers 402, 404 and 406. The PIC imagers 404 and 406 are hexagonal PIC imagers each having six sets of lenslet arrays. The PIC imagers 402, 404 and 406 may be stacked in a concentric manner with or without angular rotation with respect to one another. The stacked configuration 400 can provide a full UV space coverage (at least for the longest baselines) in each PIC imager. The UV density provided by the stacked configuration 400 may be limited by the area required for interferometer components to support all baselines.

Figure 5:
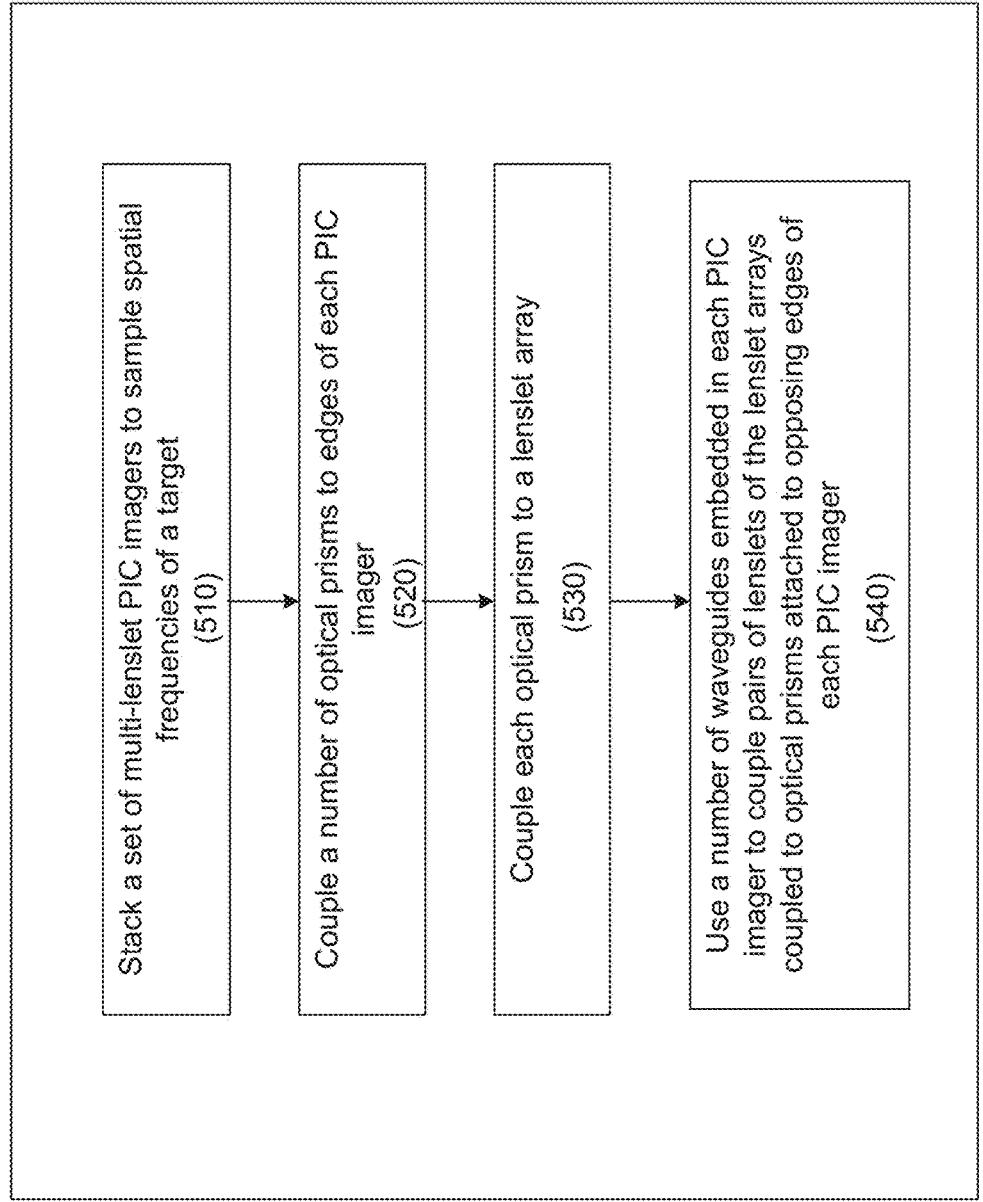
FIG. 5 is a flow diagram of a method of providing an interferometric imager, according to certain aspects of the disclosure.

FIG. 5 is a flow diagram of a method 500 of providing an interferometric imager, according to certain aspects of the disclosure. The method 500 includes stacking a set of multi-lenslet PIC imagers (e.g., 210, 220, 230 and 240 of FIG. 2A) to sample spatial frequencies of a target (510). A number of optical prisms (e.g., 112 and 122 of FIGS. 1A and 1B) are coupled to edges of each PIC imager (e.g., 140 of FIGS. 1A and 1B) (520). Each optical prism is coupled to a lenslet array (e.g., 110 and 120 of FIGS. 1A and 1B) (530). A number of waveguides are embedded in each PIC imager and are used to couple pairs of lenslets (e.g., 110-1 and 120-N of FIG. 1B) of the lenslet arrays coupled to optical prisms attached to opposing edges of each PIC imager (540). The set of multi-lenslet PIC imagers are separated from one another by substrate spacers (e.g., 144 of FIG. 1A).

Figure 6:
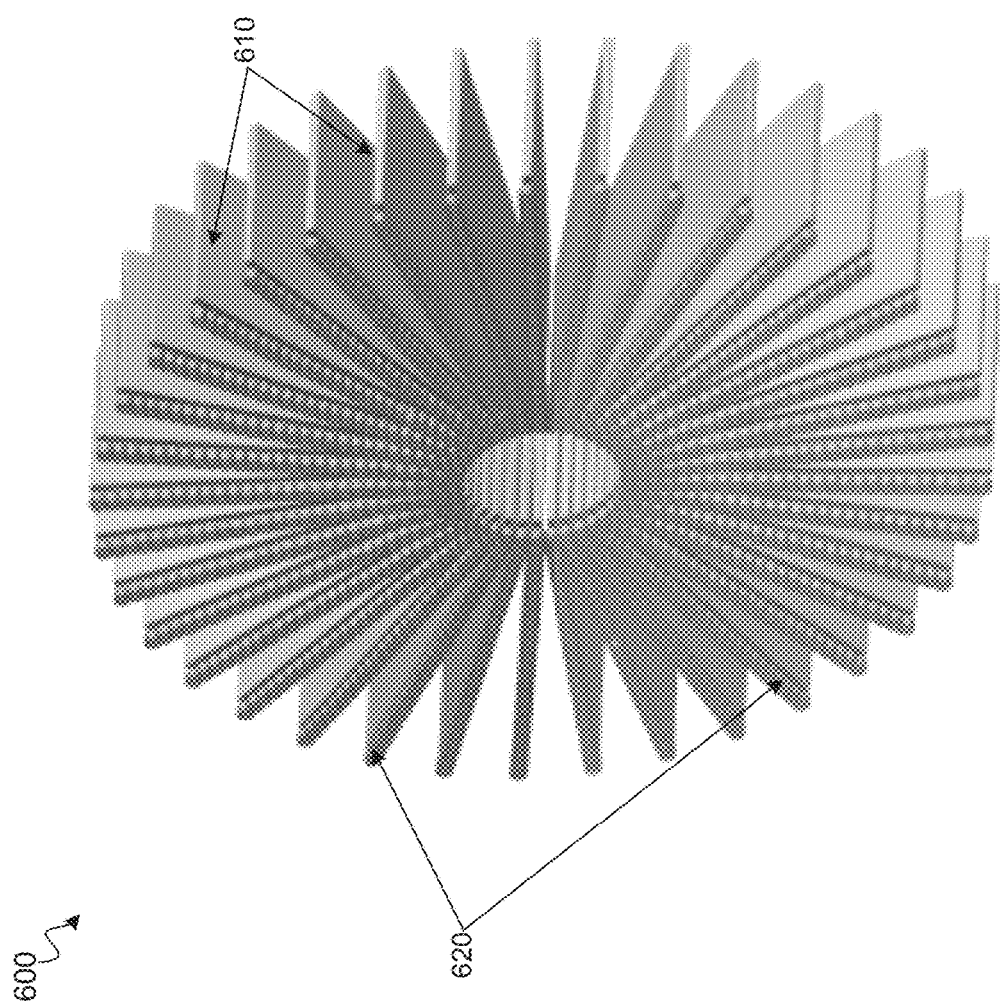
FIG. 6 is a conceptual diagram illustrating an example of a segmented planar imaging detector for electro-optical reconnaissance (SPIDER).

FIG. 6 is a conceptual diagram illustrating an example of a segmented planar imaging detector for electro-optical reconnaissance (SPIDER) 600. The SPIDER 600 is a multi-blade structure formed of a large number of blades 610. Each blade 610 includes a sensor array implemented on a PIC. Each sensor array is an interferometric imaging device including a number of waveguide arrays. Each blade 610 includes a lenslet array 620 consisting of a large number of lenslets arranged in a linear array and coupled to an edge of blade 610. Each lenslet concentrates light rays to a number of waveguides of a waveguide array. A more detailed discussion of SPIDER can be found in U.S. Pat. No. 8,913,859 B1, which is incorporated by reference herein.

In some aspects, the subject technology is related to photonic integrated circuits, and more particularly to dual-lenslet PIC imagers and packaging configurations. In some aspects, the subject technology may be used in various markets, including, for example and without limitation, sensor technology and communication systems markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A dual-lenslet array photonic integrated circuit (PIC) imager, the PIC imager comprising:
   a PIC including top and bottom substrate spacers;
   a first optical prism configured to couple a first lenslet array to a first-side edge of the PIC; and
   a second optical prism configured to couple a second lenslet array to a second-side edge of the PIC,
   wherein:
   lenslets of the first lenslet array and respective lenslets of the second lenslet array are coupled to respective waveguides embedded in the PIC.

2. The PIC imager of claim 1, wherein optical axes of lenslets of the first lenslet array and the second lenslet array are normal to a plane of the PIC.

3. The PIC imager of claim 2, wherein the first lenslet array and the second lenslet array are configured to direct first and second sets of input light beams into the respective waveguides.

4. The PIC imager of claim 2, wherein the first optical prism and the second optical prism are configured to respectively fold optical beams from the first lenslet array and the second lenslet array by 90 degrees.

5. The PIC imager of claim 2, wherein lengths of arrays forming the first lenslet array and the second lenslet array are substantially equal to half of a length of the first-side edge and the second-side edge of the PIC, respectively.

6. The PIC imager of claim 5, wherein the first lenslet array and the second lenslet array are coupled diagonally to the first-side edge and the second-side edge of the PIC to achieve largest possible baselines.

7. The PIC imager of claim 6, wherein the respective waveguides are configured to couple the first lenslet array and the second lenslet array to achieve a baseline length diversification and a baseline angular diversification.

8. A interferometric imager comprising:
   a stack of a set of multi-lenslet PIC imagers configured to sample spatial frequencies of a target, each multi-lenslet PIC imager comprising:
   a PIC including top and bottom substrate spacers;
   a plurality of optical prisms configured to couple a plurality of lenslet arrays to a plurality of edges of the PIC; and
   a plurality of waveguides embedded in the PIC and configured to couple respective lenslets of the plurality of lenslet arrays.

9. The interferometric imager of claim 8, wherein optical axes of lenslets of the plurality of lenslet arrays are normal to a plane of the PIC.

10. The interferometric imager of claim 8, wherein the plurality of lenslet arrays are configured to direct a plurality of input light beams into respective waveguides of the plurality of waveguides.

11. The interferometric imager of claim 8, wherein the plurality of optical prisms are configured to fold respective optical beams from the plurality of lenslet arrays by 90 degrees.

12. The interferometric imager of claim 8, wherein lengths of the plurality of lenslet arrays are substantially equal to half of lengths of respective edges of the plurality of edges of the PIC.

13. The interferometric imager of claim 8, wherein pairs of lenslet arrays of the plurality of lenslet arrays are coupled to opposite edges of the plurality of edges of the PIC to achieve largest possible baselines.

14. The interferometric imager of claim 8, wherein the set of multi-lenslet PIC imagers include a plurality of dual-lenslet rectangular PIC imagers, and wherein the plurality of dual-lenslet rectangular PIC imagers are stacked on top of one another in a circular configuration and at different angles to substantially sample spatial frequencies associated with an entire circle.

15. The interferometric imager of claim 8, wherein the set of multi-lenslet PIC imagers include a plurality of dual-lenslet trapezoidal PIC imagers with different widths, and wherein the plurality of dual-lenslet trapezoidal PIC imagers are stacked on top of one another in a linear configuration.

16. The interferometric imager of claim 8, wherein the set of multi-lenslet PIC imagers include a plurality of multi-sided PIC imagers with different diameter sizes, and wherein the plurality of multi-sided PIC imagers are stacked on top of one another to substantially sample spatial frequencies associated with an entire area of a largest multi-lenslet PIC imager of the set of multi-lenslet PIC imagers.

17. A method of providing an interferometric imager, the method comprising:
   stacking a set of multi-lenslet PIC imagers to sample spatial frequencies of a target by:
   coupling a plurality of optical prisms to a plurality of edges of each PIC imager of the set of multi-lenslet PIC imagers;
   coupling each of the plurality of optical prisms to a lenslet arrays; and
   coupling a plurality of waveguides embedded in each PIC imager of the set of multi-lenslet PIC imagers to pairs of lenslets of lenslet arrays coupled to optical prisms coupled to opposing edges of the plurality of edges of each PIC imager,
   wherein the set of multi-lenslet PIC imagers are separated from one another by substrate spacers.

18. The method of claim 17, wherein the set of multi-lenslet PIC imagers includes a plurality of dual-lenslet rectangular PIC imagers, and wherein stacking the set of multi-lenslet PIC imagers comprises stacking the plurality of dual-lenslet rectangular PIC imagers on top of one another in a circular configuration and at different angles to substantially sample spatial frequencies associated with an entire circle.

19. The method of claim 17, wherein the set of multi-lenslet PIC imagers includes a plurality of dual-lenslet trapezoidal PIC imagers with different widths, and wherein stacking the set of multi-lenslet PIC imagers comprises stacking the plurality of dual-lenslet trapezoidal PIC imagers on top of one another in a linear configuration.

20. The method of claim 17, wherein the set of multi-lenslet PIC imagers includes a plurality of multi-sided PIC imagers with different diameter sizes, and wherein stacking the set of multi-lenslet PIC imagers comprises stacking the plurality of multi-sided PIC imagers on top of one another to substantially sample spatial frequencies associated with an entire area of a largest multi-lenslet PIC imager of the set of multi-lenslet PIC imagers.

* * * * *